INVENTORS
ALBERT J. GARBIN
RALPH F. GARNER
BY John D. Haney
ATTY.

United States Patent Office 3,049,460
Patented Aug. 14, 1962

3,049,460
METHOD OF MAKING SIDE DRIVING V-BELTS REINFORCED WITH LATERALLY SPACED CABLED TENSION MEMBERS
Albert J. Garbin and Ralph F. Garner, Cuyahoga Falls, Ohio, assignors to The B. F. Goodrich Company, New York, N.Y., a corporation of New York
Filed May 8, 1957, Ser. No. 657,889
5 Claims. (Cl. 156—140)

This invention relates to the manufacture of side-driving power transmission belts commonly known in the art as V-belts. The invention more particularly concerns the manufacture of power transmission belts which are reinforced with laterally spaced cabled tension members such as grommets as described in U.S. Patent 2,233,294, and pertains to belts of this character which have either a single set of side-driving faces or which include multiple sets of side-driving faces as the so-called double or "hex" V-belts.

One of the principal problems in making a belt reinforced with a pair of cabled tension members has been in curing the "green" or unvulcanized belt with the plane of the cabled tension members oriented accurately relative to the driving faces of the belt. In the conventional techniques used heretofore for manufacturing such a belt, the rubber-like moldable composition forming the body of the belt is generally extruded to substantially the same cross-sectional shape as the shape to which the belt is eventually molded. But by the time all the components of the belt including the surrounding cover are assembled, the green belt may be somewhat square or round in cross section depending on whether the belt is a single or a double V-belt. Accordingly, it is very difficult for a mold operator to determine the plane in which the cabled tension members lie when he positions a green belt in the finishing mold. It frequently happens, therefore, that the green belt is improperly located in the mold and is molded with the plane of the tension members canted objectionably so that the resulting cured belt is defective.

According to this invention, a green belt is constructed so that a mold operator can easily determine the plane of the tension members and, thus is able to position the belt correctly in the mold cavity. To accomplish this, this invention provides for forming the belt body around its cabled tension members with a longitudinal groove in one face of the body between the pair of members. Preferably the belt body is formed with such a groove in each of two opposing faces of the belt between the cabled members, the grooved faces ultimately being the inner and outer circumferential faces of the belts. These grooves can be easily seen and/or felt. Thus the operator can use these grooves as a guide to position the green belt accurately in the mold cavity, the belt being positioned with the grooves located between the opposing lateral sides of the cavity.

In accordance with this invention, green belts formed with such a grooved body may be molded under tension by the usual procedures to the conventional trapezoidal or hexagonal cross-sectional shapes, as desired. It is particularly advantageous, however, to mold a green belt formed in accordance with this invention in a mold cavity in which there are longitudinal molding ribs which register with the grooves in the green belt body. The advantage in this procedure is that the ribs, inasmuch as they project a substantial distance toward the region of the body between the cabled tension members, provide for substantially equalizing the molding pressure on the rubber body surrounding each cabled tension member and therefore during molding the ribs provide a further means for molding the belts with the tension members accurately positioned. For example, if in the assembly of the green belt the tension members happen to be inaccurately positioned, the tension members will by virtue of the pressure exerted by the ribs in the mold cavity and the tension on the belt, tend to "float" or displace the tension members toward their correct positions in the belt body.

Another advantage derived from finishing the belts in molds including ribs is that the cover fabric may be drawn snugly around the body by the ribs during the molding operation and thus the cover adhesion to the belt body is substantially improved. When using a cover of a material such as nylon, the component fibers of which are stretchable under heat and pressure, the cover cloth may be wrapped around the belt body in conformity with the contour of the body but so that the cover bridges the mouths of the grooves between the tension members. Accordingly, the pressure of the ribs acts against the bridged portions of the cover when the mold is closed to stretch these portions into their respective grooves. In so doing the remaining portions of the cover are also stretched and pulled snugly against the belt body. Alternatively, prior to placing the belt in a mold, the cover cloth may be wrapped on the belt body so that the cover is folded into the groove or grooves therein. Even though the cover does not bridge the grooves when the belt is placed in a mold, the mold ribs still exert a desirable stretching effect on the cover. It is desirable to conform the cover to the grooves prior to the molding step where the cover is a material the fibers of which are only slightly stretchable such as rayon or cotton.

The invention will be further described with reference to the accompanying drawing which in semi-schematic form illustrates one practical embodiment of the invention. In the drawings.

The several views of the drawings show by way of example successive steps in making a so-called "hex" or double V-belt 10 in accordance with this invention. The parts of this belt 10 (see FIG. 3) include a pair of cabled tension members 12, a body of uncured rubber-like composition 14 in which the tension members 12 are embedded, and a cloth cover 15 enclosing the body. As noted in the foregoing the cabled tension elements may be and preferably are annular grommets formed in accordance with U.S. Patent 2,233,294.

Figure 1:
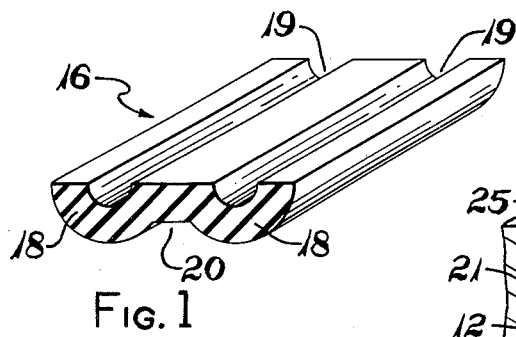
FIG. 1 is a fragmentary perspective view showing one way in which a portion of the belt body may be formed prior to its assembly with the other parts of the belt.
Figure 2:
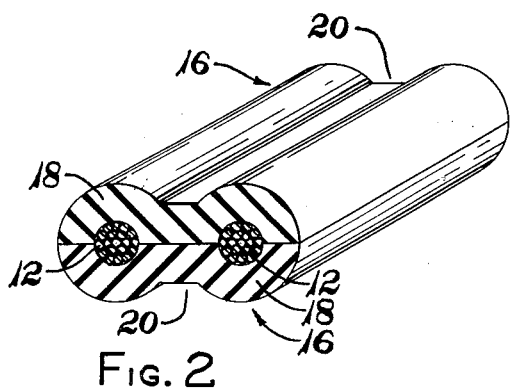
FIG. 2 is a fragmentary perspective view showing body sections such as that of FIG. 1 assembled with a pair of cabled tension members.

In the illustrated embodiment of the invention, the rubber body 14 is initially extruded in the form of two separate body sections of rubbery-like material similar to the body section 16 shown in FIG. 1 which has a cross-sectional shape in the appearance of a numeral 3. The green belt body 14 is formed by assembling two body sections 16 in a face-toface relation enclosing the cabled members 12 as shown in FIG. 2, the assembled body sections having a cross-sectional shape like a numeral 8. Each body section 16 includes two wing portions 18 of uniform thickness and in which there are longitudinal semi-cylindrical channels 19 to receive the cabled members 12. Between the wing portions on the external or convex surfaces of each section 16, there is a groove 20 which extends into the region of the belt body between the cabled members when the green belt is fully assembled. The sides of the body sections in which grooves 20 are located ultimately form the inner and outer circumferential faces of the belt when the belt is eventually molded.

Figure 3:
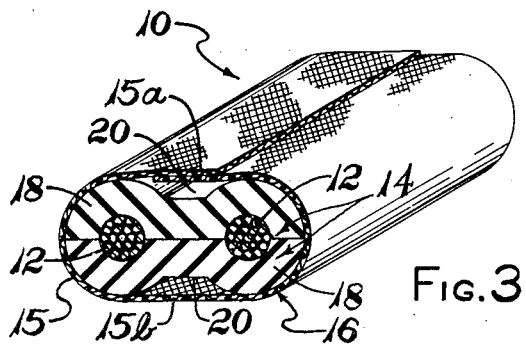
FIG. 3 shows a complete green belt including cover enclosing the body portion but with portions of the cover bridging the grooves in the body defining the plane of the grommets.

The fabric cover 15 may be a conventional belt covering fabric and is preferably wrapped around the belt body 14 by conventional belt building procedures. Ordinarily, the cover 15 will be a square-woven fabric laid on the bias about the belt. In FIG. 3 the cover 15 is applied to the belt body 14 so that portions of the cover 15a and 15b bridge the grooves 20 in opposite faces of the belt between the cabled tension members 12. The remaining portions of the cover conform to the contour of the belt body 14 and the seam of the cover is preferably located overlying one of the grooves 20.

Figure 4:
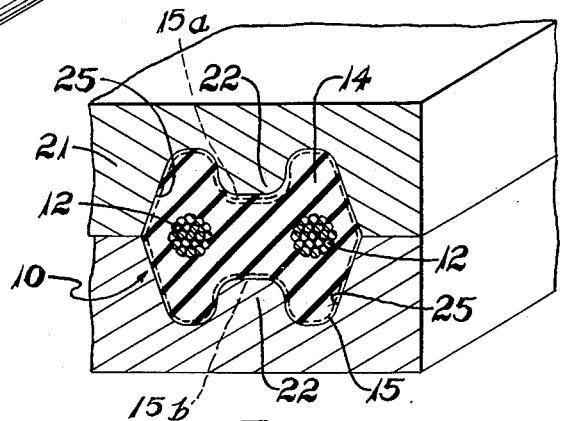
FIG. 4 is a partial perspective view of a section of a rib type mold suitable for molding the carcass of FIG. 3 into a double or "hex" V-belt.

If the volume of the rubber body 14 is suitably selected, the green belt casing as shown in FIG. 3 may be cured in a conventional mold cavity having mold faces oriented in hexagonal shape. On the other hand, it is particularly convenient and desirable to vulcanize a green belt like that shown in FIG. 3 in mold members 21 having longitudinal internal ribs 22 as represented in FIG. 4. The ribs 22 are located intermediate the sets of lateral mold faces 25 of the mold members which form the side-driving faces of the finished belt. The belt is positioned in the mold by the operator so that the grooves 20, which may be seen and/or felt easily by the operator, are in register with the ribs 22. When the upper mold member 21 is closed upon the lower mold member, molding pressure is exerted on the green belt carcass so that the ribs press against the bridging portions 15a and 15b of the cover and urge these forcibly into the grooves 20. The ribs therefore tend to stretch the cover fabric snugly about the body.

Figure 5:
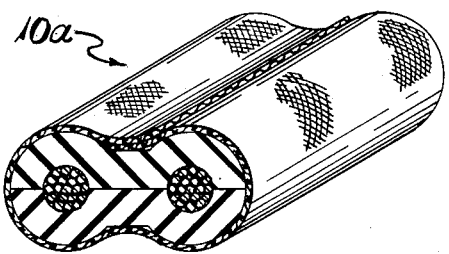
FIG. 5 is a view like FIG. 3 but showing the fabric cover conforming to the contour of the belt body including the grooves therein.

The green belt construction of FIG. 3 wherein the cover fabric bridges grooves 20 is particularly well suited for use with cover fabrics such as nylon, the fibers of which are stretchable. On the other hand, it has been found more convenient when covering belts with fabrics such as rayon or cotton to fold the cover fabric into grooves 20 during the assembly of the belt so that the green belt has the finished appearance as shown in FIG. 5 before it it molded to its final shape. The belt 10a in FIG. 5 may be formed in a mold such as that shown in FIG. 4 or in a conventional mold, viz. a mold which does not have longitudinal ribs 22.

To one skilled in this art, it will be evident that the grooved rubber body 14 may be formed about the cabled tension members in a variety of different ways. Ordinarily in belts of this construction, the "rubber" body of the belt is a vulcanizable composition which is cured by heat and pressure. For the purpose of this invention, the terms "rubber" or "rubber-like" include the various natural and synthetic materials having the characteristic flexibility and extensibility of tree grown rubber, whether or not they are subjected to a vulcanizing process in the final molding operation. Various other modifications are obviously within the scope of the invention as it is defined in the appended claims.

We claim:

1. The method of making a side-driving belt of the class in which a vulcanizable rubber body is reinforced lengthwise with only two parallel laterally spaced flexible cabled tension members, said method comprising forming a longitudinal groove in an external face of said body with said tension members disposed inside said body and with said body in an unvulcanized state, said groove being formed so that it extends lengthwise of said body and into said body toward a region thereof between the cabled tension members in said body, enclosing said unvulcanized body, including said groove, in a cloth cover, thereafter placing the resulting assembly of said grooved body and tension members and said cover in a mold cavity using said groove under said cover as a guide for positioning the assembly, so that said groove extends lengthwise of the cavity between two opposing molding faces of the cavity and the plane of said tension members has a preselected orientation relative to said molding faces of the cavity, and then confining said assembly in said mold cavity under heat and pressure to vulcanize said rubber body and to mold said assembly to the shape of said cavity.

2. The method of claim 1 which comprises placing said resulting assembly of said unvulcanized grooved rubber body and said tension members and said cover in a mold cavity which has a molding rib therein for registering with said groove.

3. The method of claim 1 which comprises forming an additional longitudinal groove in an external face of said unvulcanized body which face is on the opposite side of said body from the face in which said first groove is formed, said additional groove also extending lengthwise of said body and extending into said body in opposed relation to the first said groove toward a region of said body between said tension members disposed therein.

4. The method of claim 3 which comprises enclosing said body in said cloth cover so that the cover closely conforms to the shape of said body and extends into said groove in said body.

5. The method of claim 3 which comprises enclosing said body in said cloth cover so that the cover conforms to the shape of said body but bridges across the mouth of said groove in said body whereby said rib of said molding cavity registers with said groove to tighten the cloth cover snugly against said body and to stretch the bridging portion of said cover into said body groove.

References Cited in the file of this patent

UNITED STATES PATENTS

| | | |
|---|---|---|
| 665,989 | Bechtold | Jan. 15, 1901 |
| 1,923,542 | Keyes et al. | Aug. 22, 1933 |
| 1,969,067 | Freeman | Aug. 7, 1934 |
| 1,977,108 | Arnberg | Oct. 16, 1934 |
| 2,054,619 | Freedlander | Sept. 15, 1936 |
| 2,107,013 | Morgan | Feb. 1, 1938 |
| 2,214,098 | Carlson | Sept. 10, 1940 |
| 2,230,289 | Dodge | Feb. 4, 1941 |
| 2,233,294 | Merrill et al. | Feb. 25, 1941 |
| 2,296,740 | Reiling | Sept. 22, 1942 |
| 2,439,043 | Evans | Apr. 6, 1948 |
| 2,444,583 | Stewart et al. | July 6, 1948 |
| 2,446,311 | Traxler | Aug. 3, 1948 |
| 2,620,016 | Adams | Dec. 2, 1952 |
| 2,792,319 | Fihe | May 14, 1957 |